US006931503B1

(12) United States Patent
Robb et al.

(10) Patent No.: US 6,931,503 B1
(45) Date of Patent: Aug. 16, 2005

(54) PROTECTED STORAGE DEVICE FOR COMPUTER SYSTEM

(75) Inventors: David Shepherd Stewart Robb, Cupar (GB); Victor Andrew Leitch, Cupar (GB); Richard Samuel Bailie, Cupar (GB)

(73) Assignee: Sirkon Limited, Edinburgh (GB)

( * ) Notice: Subject to any disclaimer, the term of this patent is extended or adjusted under 35 U.S.C. 154(b) by 0 days.

(21) Appl. No.: 09/674,902

(22) PCT Filed: May 7, 1999

(86) PCT No.: PCT/GB99/01431

§ 371 (c)(1),
(2), (4) Date: Nov. 7, 2000

(87) PCT Pub. No.: WO99/59049

PCT Pub. Date: Nov. 18, 1999

(30) Foreign Application Priority Data

May 9, 1998 (GB) .................................... 9809885

(51) Int. Cl.$^7$ ...................... G06F 12/00; G06F 15/177
(52) U.S. Cl. .................... 711/163; 713/2; 713/200; 711/100
(58) Field of Search ................... 711/163, 152, 113, 711/100; 713/2, 200; 710/113

(56) References Cited

U.S. PATENT DOCUMENTS 4,459,665 A * 7/1984 Miu et al. .................... 710/113
5,325,519 A    6/1994 Long et al.
5,375,243 A   12/1994 Parzych et al.
5,586,301 A * 12/1996 Fisherman et al. .......... 711/152
5,657,473 A *  8/1997 Killean et al. ............... 711/163
5,913,058 A *  6/1999 Bonola .......................... 713/2
6,016,536 A    1/2000 Wu et al.

(Continued)

FOREIGN PATENT DOCUMENTS

EP       0 510 244      10/1992

(Continued)

OTHER PUBLICATIONS

Copy of Search Report for British Appl. No. GB 9910438.2, dated Dec. 9,1999.

(Continued)

*Primary Examiner*—Kim Vu
*Assistant Examiner*—Eleni Shiferaw
(74) *Attorney, Agent, or Firm*—Alston & Bird LLP (57) ABSTRACT

The invention is a storage device (1) for a host computer system. The device (1) incorporates a Supervisor function for controlling access to information stored in a storage medium (2) of the device. The main embodiment described is a hard disk drive (1) comprising: one or more disk platters (2) for storing information; a ROM (4) for storing firmware for controlling operation of the drive; a volatile RAM (5); a micro-controller (7) for controlling the transfer of information to and from the disk platter(s) (2); and an interface (6) for interfacing the drive (1) with the host computer system and via which information is transferred to and from the disk platter(s) (2) under the control of the micro-controller (7). A Supervisor is provided in the form of firmware which is preferably stored in the ROM (4), the Supervisor operating the micro-controller (7) so as to protect information stored on the disk platter(s).

28 Claims, 2 Drawing Sheets

U.S. PATENT DOCUMENTS 6,092,161 A * 7/2000 White et al. ................ 711/163
6,240,527 B1   5/2001 Schneider et al.

FOREIGN PATENT DOCUMENTS

| EP | 0 800 135 A1 * | 8/1997 | ........... G06F 11/00 |
| EP | 0 800 135 | 10/1997 | |
| EP | 0 827 059 | 3/1998 | |
| GB | 2 304 212 | 3/1997 | |
| TW | 0422956 B | 2/2001 | |
| WO | WO-87/07061 | 11/1987 | |
| WO | WO-91/13403 | 9/1991 | |

OTHER PUBLICATIONS

Copy of Examination Report for British Appl. No. GB 9910438.2 dated Jun. 19, 2002.

* cited by examiner

PROTECTED STORAGE DEVICE FOR COMPUTER SYSTEM

FIELD OF THE INVENTION

The present invention relates to a method and apparatus for controlling access to and corruption of information in a computer system.

BACKGROUND

U.S. Pat. No. 5,657,473 discloses a method and apparatus particularly concerned with the detection and containment of hostile programs such as "virus" programs within computer systems, said method including dividing the information stored on the storage medium into a plurality of non-overlapping partitions, including a boot partition and a plurality of general partitions, each of the partitions being further divided into a plurality of sectors, any designated subset of the general partitions being active at any given time when the computer system is in use, said invention employing a supervising means (a Supervisor) separate of the central processing unit (CPU)

allowing/restricting/prohibiting read/write operations upon the storage medium depending on whether information to be read from a sector or written to a sector is in the boot partition, or in a general partition, and whether the partition is active or inactive, and said supervising means also allowing a format operation only on a partition which is active and prohibiting a format operation on the boot partition, or on a general partition if it is inactive.

The described invention preferably uses a second processor which is made inaccessible to the user and to the virus, supervising all data transfers between and within sub-divisions of the device or devices placed under its control.

The Patent Application-describes, as an example, an embodiment comprising a printed circuit board assembly containing a dedicated micro-controller, used in place of the hard disk controller within the computer system.

EP 0 800 135 A1 discloses a method and apparatus for controlling access to and modification of information stored on a storage medium forming part of a computer system, said invention including by reference all aspects of the aforesaid invention of U.S. Pat. No. 5,657,473, said invention designating at least one partition a Write Many Recoverable (WMR) partition wherein, in use, if a write command is issued to overwrite any resident information stored in a/the WMR partition by updated information, the updated information is written on the storage medium in a location other than where any resident information is stored and a pointer to the updated information is stored in a Sector Relocation Table (SRT) so that the updated information can be accessed, as required during the remainder of a (user) session. An alternative method is also described wherein, if a write command is issued to overwrite any resident information stored in a/the WMR partition, prior to undertaking said write command said information is copied and stored elsewhere on the storage medium to be copied back to said WMR partition when required. This could be implemented, for example, by a system reset.

The application describes, as an example, an embodiment comprising a printed circuit board assembly (PCBA) containing a dedicated micro-controller placed in-line between the computer system hard disk drive controller (often embedded within the computer system motherboard) and the hard disk drive.

The method and apparatus in the aforementioned inventions propose the use of a second processor separate from the computer system central processing unit (CPU). Although the aforesaid inventions do not specifically limit their scope to combined hardware and firmware embodiments, both describe in detail embodiments which include a separate printed circuit board assembly, placed between the CPU and the storage medium Such hardware embodiments have the following disadvantages: Such hardware embodiments have an associated cost per unit, which results in a base cost for the invention which must be met irrespective of sales volume;

Such hardware embodiments must be installed within the computer system, generally requiring the computer system case to be removed;

Such hardware embodiments require safety and emission approvals and require a high level of testing to ensure compatibility across the wide spectrum of existing computer systems;

Such hardware embodiments are subject to a level of component failures.

SUMMARY OF THE INVENTION

It is the subject of the present invention to avoid or minimise one or more of the aforesaid disadvantages. This document discloses a method (and related apparatus for) incorporating the methods outlined in both U.S. Pat. No. 5,657,473 and EP 0 800 135 A1 into the storage device itself.

Storage devices are frequently intelligent containing their own processor module, this being a potential candidate to undertake the functions of a Supervisor as described within the aforesaid inventions. This intelligent module controls the transfer of information to and from the storage medium via the interface to the computer system. According to the present invention as defined herebelow, this intelligent module is used to allow/restrict/prohibit, read/write operations upon the storage medium in a manner consistent with the aforesaid inventions.

According to a first aspect of the invention we provide a storage device for a host computer system, the storage device comprising: storage means for storing information; intelligent means for controlling the transfer of information to and from the storage means; and interfacing means for interfacing the storage device with the host computer system and via which information is transferred to and from the storage means under the control of said intelligent means, the storage means comprising: a storage medium divided into a plurality of non-overlapping partitions; non-volatile read-only-memory (ROM) means for storing firmware for controlling operation of the storage device; and volatile random-access-memory (RAM) means;

wherein supervising means is incorporated in said storage means for operating said intelligent means so as to protect information stored in the storage medium.

The term "information" as used herein is intended to cover information, data and/or program code, any or all of which may be stored in the storage means.

The supervising means ("Supervisor") preferably protects the said information by controlling access to and modification thereof in accordance with pre-programmed protection criteria.

Incorporating the Supervisor within the storage device has the following advantages:

where an intelligent means is already present on the storage device, the methods outlined in the aforesaid inventions may be implemented with no hardware changes to the storage device; physical installation of a separate PCBA containing the Supervisor is no longer required; Supervisor firmware may be included within the storage device during manufacture or may be added by means of a software utility;

since a separate PCBA is no longer required, manufacturing costs are significantly reduced by removing the requirement for additional hardware components and no additional safety or emission testing is required over and above that required for the storage device without Supervisor firmware;

by removing the requirement for additional circuitry external to the storage device, there is a reduction in the compatibility issues that may arise from the diversity of computer systems and storage device combinations which are possible.

A further advantage is that by incorporating the Supervisor in the storage device, rather than in additional hardware, this allows the Supervisor to be implemented in laptop, notebook and/or other small portable computers since there is no extra space required for such additional hardware.

In prior art systems in which the Supervisor was provided as additional hardware located between the storage device and the host CPU, one problem was that the computer system could potentially be tampered with so as to remove this additional hardware, in order to make the computer system operate as normal, without the Supervisor. A further advantage of the present invention is that by incorporating the Supervisor within the storage device, the Supervisor cannot be removed without removing and/or tampering with the storage device itself.

A further significant advantage of the present invention is that whereas in the prior art system the Supervisor hardware was located on the interface between the storage device and the host CPU, and therefore changes in this interface (e.g. an increase or change in data flows across the interface) required reconfiguration and/or adjustment of data handling by the Supervisor, in the present invention the Supervisor is independent of such interface changes by virtue of being incorporated in the storage device itself. Interface changes thus do not affect the Supervisor.

The storage device may be a hard disk drive. The storage medium may comprise one or more disk platters. The supervising means is preferably provided as firmware which is stored in said non-volatile ROM on the storage device. It will be appreciated that if an unauthorised user were to attempt to remove the Supervisor by removing the ROM, this will render the storage device inoperative.

The intelligent means preferably comprises a processor, often referred to as a micro-controller, which runs the Supervisor firmware stored in the ROM means. Hard disk drives are now available which incorporate a printed circuit board assembly (PCBA) including a micro-controller for running programs stored in memory means provided on the PCBA. In such drives, this processor means may conveniently function as the micro-controller for use in the present invention. The Supervisor firmware can be stored in non-volatile ROM provided on the PCBA.

Said non-overlapping partitions into which the storage medium is divided preferably include a boot partition and at least one general partition, each said partition being divided into a plurality of sectors. The storage medium may have a plurality of general partitions defined thereon, any designated subset of which are active at any given time, in use of the computer system.

Preferably, the supervising means operates said intelligent means so as to allow/restrict/prohibit read/write operations upon the storage medium depending upon whether information to be read from a sector or written to a sector is operating system information or user information, whether the sector is in the boot partition or in a general partition and whether if the partition is a general partition the partition is active or inactive. The supervising means may also allow a format operation only on a general partition which is active and prohibit a format operation on the boot partition or on a general partition which is inactive. The supervising means preferably also monitors commands passing through the interfacing means between the storage device and the host computer system and prevents predetermined potentially disruptive interface commands from being implemented. For example, the supervising means may prevent disruptive Vendor Unique Commands or Format Track commands from being carried out.

It will be appreciated that the supervising means preferably also ensures that firmware stored on the ROM means of the storage device, which includes the firmware providing the supervisor means, is also protected in that a user, or a user program operating in the host computer system, does not have access to the ROM means (or the RAM means) of the storage device itself and any firmware or other code stored therein is thus unalterable by the user or user program.

Optionally, the supervising means may cause a warning to be issued to the user should an attempt be made to perform a prohibited read, write or format operation.

At least one of said partitions of the storage device may comprise a Write Many Recoverable (WMR) partition wherein, in use if a write command is issued to overwrite (i.e. update) any information stored in the WMR partition the updated information is stored elsewhere on the storage medium, preferably in a dedicated area of the storage medium, and a pointer to the updated information is provided so the updated information can be accessed as required during the remainder of the session, wherein a system reset causes the list of pointers to the updated information, and optionally the updated information itself, to be cleared.

Where such a WMR partition is provided, the or each said WMR partition preferably has a Sector Relocation Table (SRT) associated therewith which is held in said volatile RAM means of the storage device, each entry in a said SRT is a pointer which defines the address of a range of sectors in the WMR partition that have been updated and an address where the updated information is located, this location being within a dedicated area on the storage medium which is accessed only by the supervisor means.

Alternatively, at least one of said partitions of the storage device comprises a Write Many Recoverable (WMR) partition wherein, in use, if a write command is issued to overwrite (i.e. update) any information stored in a/the WMR partition prior to undertaking said write command said information is copied and stored elsewhere on the storage medium to be copied back to said WMR partition when required. This could be implemented, for example, by a system reset.

Where the storage medium comprises at least one disk platter and a boot partition, said boot partition will include a disk boot sector. According to the present invention, the storage device may be provided with loader means and said supervising means may be adapted to intercept any request for the disk boot sector, issued by the host computer system in use thereof, and supply said loader means to satisfy the request. The loader means is preferably configured to load or transfer a predetermined code segment, which is stored on the storage means, to a central processing unit (CPU) of the host computer system to be executed by the computer system prior to (normal) operating system boot. This code segment may provide user prompts, and communication with the supervising means. The loader means is preferably provided in said non-volatile ROM of the storage device. Alternatively, said loader means may be provided in a reserved area on the storage medium, for example in one or more reserved tracks of a said disk platter of the storage device. This reserved area is preferably inaccessible to a user or user program (but is accessible to the Supervising means) whereby unauthorised alteration of the loader means is prevented.

The code segment may be provided in said non-volatile ROM means of the storage device or, preferably, in a reserved area of the storage medium which is also preferably inaccessible to a user or user program, but is accessible to the Supervising means, whereby unauthorised alteration of the code segment is prevented.

Optionally, the storage device may be placed in either "supervised" mode, in which the supervising means is active, or "unsupervised", mode in which the supervising means is not active. Said code segment, when executed, preferably provides user prompts which allow a user to select either "supervised" mode, or by entry of a password select "unsupervised" mode. The code segment is preferably constructed such that, subsequent to mode selection by the user, the code segment transfers and executes the boot program from the disk boot sector of the storage medium which, in turn, initiates operating system boot (in the host computer system) The correct password (for comparison against a password input by a user) may be stored in said non-volatile ROM of the storage device or on the storage medium itself.

According to a second aspect of the invention we provide a computer system incorporating a storage device according to the above-described first aspect of the invention.

According to a third aspect of the invention we provide a method of controlling access to and modification of information stored on a storage medium of a storage device for incorporation in a host computer system wherein the storage device comprises storage means for storing information, intelligent means for controlling the transfer of information to and from the storage means, and interfacing means for interfacing the storage device with the host computer system and via which information may be transferred to and from the storage means under the control of said intelligent means, and the storage means comprises: a storage medium; non-volatile read-only-memory (ROM) means for storing firmware for controlling operation of the storage device; and volatile random-access-memory (RAM) means;

the method comprising the steps of:
dividing the storage medium into a plurality of non-overlapping partitions including a boot partition and at least one general partition, and dividing each said partition into a plurality of sectors;
providing supervising means in said storage means for operating said intelligent means so as to protect information stored in the storage medium; and
incorporating the storage device in a host computer system, and running the host computer system with the supervising means operating said intelligent means so as to protect information stored in the storage medium.

Preferably said supervising means is provided for allowing/restricting/prohibiting read/write operations upon the storage medium depending upon whether information to be read from a sector or written to a sector is operating system information or user information, whether the sector is in the boot partition or in a general partition and whether if the partition is a general partition the partition is active or inactive, said supervising means optionally also allowing a format operation only on a general partition which is active and prohibiting a format operation on the boot partition or on a general partition which is inactive, said supervising means being adapted to intercept each interface request from the host computer system to said storage device, and the supervising means, preferably, causing a warning to be issued to the user should an attempt be made to perform a prohibited read, write or format operation which operation is prevented by the supervising means;

providing a loader means, said supervising means being adapted to supply said loader means in response to any request, issued by the host computer system, for the disk boot sector of the boot partition; and executing the loader means by the central processing unit (CPU) of the computer system in place of the requested disk boot sector, the loader sector transferring a code segment stored in the storage device, preferably in the storage medium thereof, into a RAM of the CPU for execution thereon, the code segment, when executed, initiating a user interface procedure, preferably in the form of user prompts, whereby a user may select one or more protection options;

and whereupon, subsequent to a said selection having been made by the user, said code segment transfers the disk boot program stored in the disk boot sector as originally requested and, in turn, executes the disk boot program which then initiates operating system boot (in the host computer system).

Said selection of protection options preferably includes the option, by entering a predetermined password, of setting the storage device in "unsupervised mode" whereby interface requests are not intercepted by the supervising means. The selection may also include the option of setting the storage device in "supervised" mode and further selecting one or more active partitions and/or of designating at least one of said partitions a Write Many Recoverable (WMR) partition wherein, in use, if a write command is issued to overwrite any resident information stored in a/the WMR partition by updated information, the updated information is written on the storage medium in a location other than where any resident information is stored and a pointer to the updated information is provided so that the updated information can be accessed, as required during the remainder of a session.

The method may further include storing a Sector Relocation Table (SRT) which contains the pointers associated with each said WMR partition in the volatile RAM means of the storage device.

Alternatively, the method may include the option of designating at least one of said partitions a Write Many Recoverable (WMR) partition wherein, in use, if a write command is issued to overwrite (i.e. update) any information stored in a/the WMR partition prior to undertaking said write command said information is copied and stored elsewhere on the storage medium to be copied back to said WMR partition when required. This could be implemented, for example, by a system reset.

BRIEF DESCRIPTION OF THE DRAWINGS

Preferred embodiments of the invention will now be described by way of example only, and with reference to the accompanying drawings in which:—

DETAILED DESCRIPTION OF THE INVENTION

Figure 1:
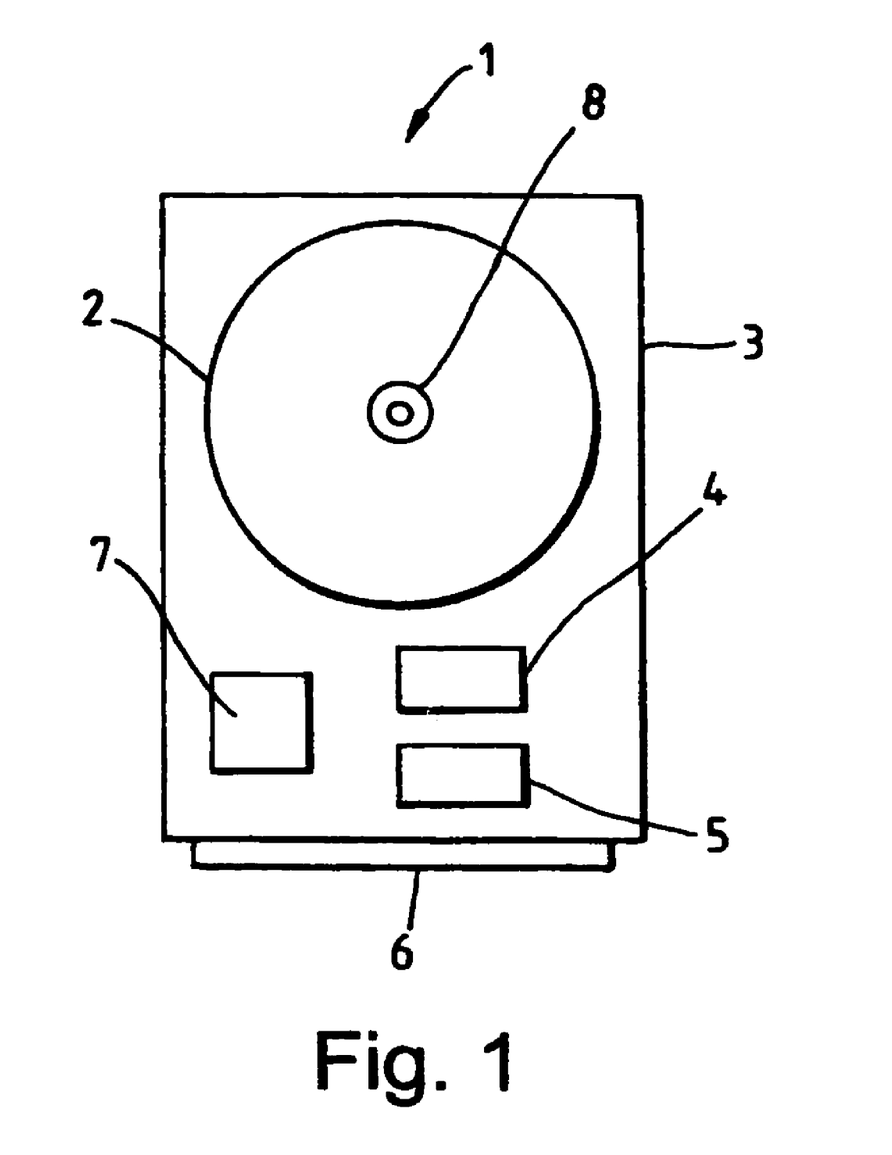
FIG. 1 is a schematic diagram of a hard disk drive according to one embodiment of the invention.

FIG. 1 shows a storage device in the form of a hard disk drive 1 for incorporating in a host computer system (not shown). The drive is of conventional form having one or more disk platters 2 mounted on a spindle motor drive mechanism on a printed circuit board assembly (PCBA) 3 having a ROM chip 4 containing firmware for controlling operation of the drive, and a RAM chip 5. The drive has an interface connector 6 which enables interfacing of the disk drive 1 to the host computer system, via which interface connector information, including user information, operating system information, data and other programs, is transferred to and from the disk platter(s) 2. The PCBA 3 has a micro-controller 7 provided thereon which runs the firmware contained in the ROM chip 4, accesses the RAM chip 5 and controls the transfer of information, data and/or programs to and from the disk platter(s) via the interface.

The firmware in the ROM includes "Supervisor" firmware for intercepting and validating each request to the hard disk (from the host computer system) in a manner previously described in U.S. Pat. No. 5,657,473, the contents of which are therefore incorporated herein by reference. The operation of the disk drive beneficially also includes a method of controlling access to and modification of information stored on the disk platter(s) of the drive utilising a Write Many Recoverable (WMR) partition (or partitions) as previously disclosed in EP 0 800 135 A1, the content of which is also therefore incorporated herein by reference.

Thus, the supervising means (Supervisor) forms part of the hard drive itself, separate of a central processing unit (CPU) of the host computer system and inaccessible to the user, the supervising means controlling access to information stored on the disk platter(s).

According to the described embodiment, the disk drive operation provides a method giving the user the capability of selecting either an "unsupervised" or "unprotected" mode through entry of a password, or selecting a supervised or "protected" mode with further selection of one or more active partitions. To do this, a loader means in the form of a "loader sector" is provided in the form of executable code stored in the non-volatile ROM chip 4, the loader sector acting as a replacement for the disk boot sector of the active partition on the storage device, whereby each request (by the host computer system) for said disk boot sector is intercepted by the Supervisor and said loader sector is supplied to satisfy the request, the loader sector being executed by the CPU of the computer system in place of the requested disk boot sector, said loader sector transferring a code segment (stored on a reserved track therefor on the disk platter s) and referred to in further detail below) into RAM of the CPU of the host computer system for execution thereby;

said code segment when executed, providing all required user prompts and communication with the Supervisor required for entry into either "protected" or "unprotected" mode, such that, subsequent to mode selection, said code segment executes the original disk boot sector program which then initiates the process of operating system boot. This modified operating system boot operation will now be explained in further detail with reference to FIG. 2 of the drawings which is a flow chart illustrating this operating system boot sequence.

Figure 2:
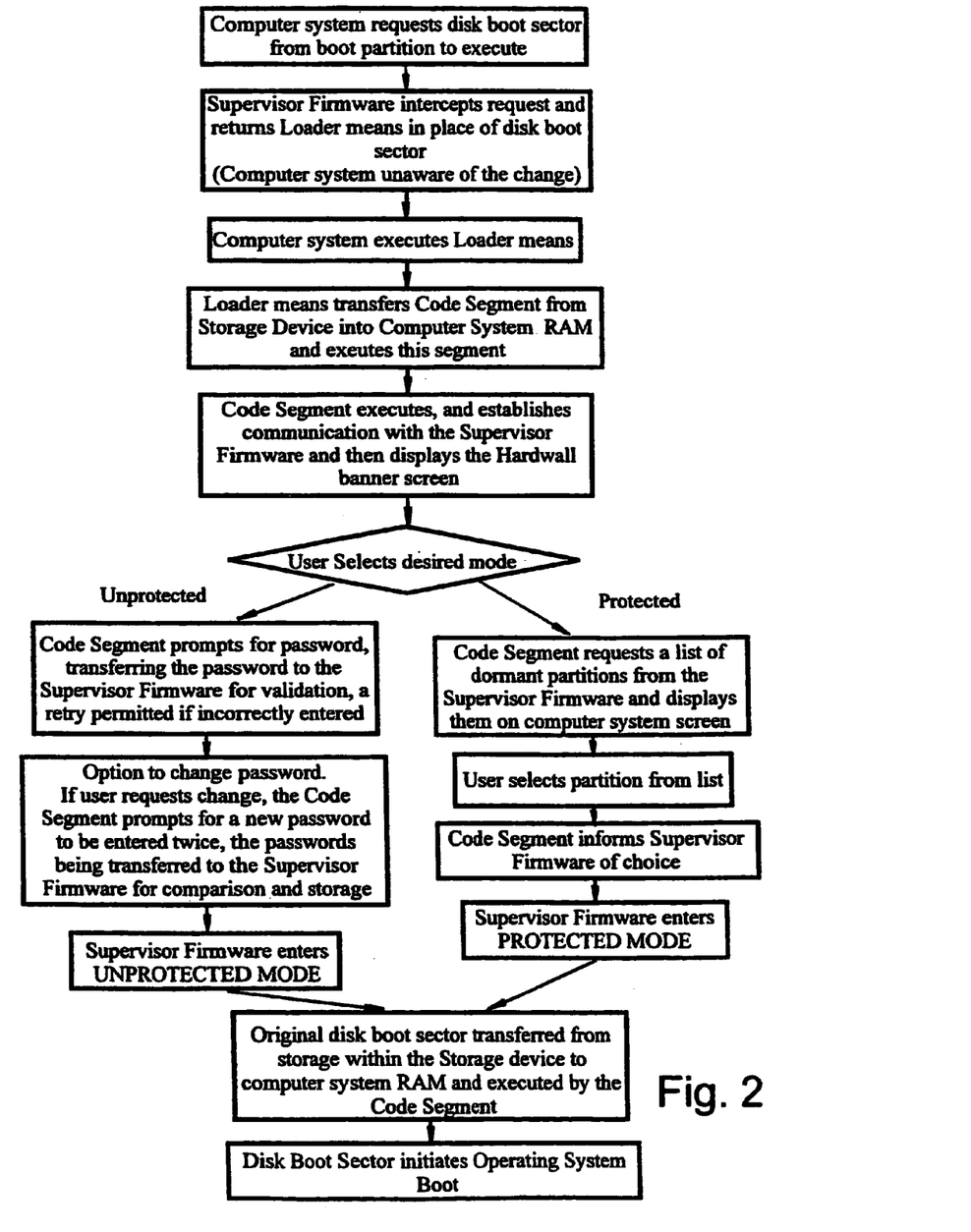
FIG. 2 is a flow chart illustrating a modified operating boot sequence implemented in the hard disk drive of FIG. 1.

In the normal operation of a computer system, upon switch on of the system (or a request to re-boot the system) the host system central processing unit (CPU) requests the disk boot sector from the boot partition of a disk platter of the hard drive. In the present invention, the Supervisor intercepts any request for the disk boot sector. Upon interception of the disk boot sector request, the Supervisor returns the loader means (namely the "loader sector") stored in the ROM chip 4 in place of the disk boot sector. The host system will be unaware of this change having been made and will execute the loader sector which, in turn, transfers a code segment, stored in the storage device, to a RAM in the host computer system. This code segment is stored in a track 8 on the disk platter (or one of the disk platters) which is reserved therefor. This track is accessible only to the Supervisor means, being a track which is outside the area of the disk platter accessible to the host operating system.

The code segment contains code, to be executed by the host system, which issues user prompts and which communicates with the Supervisor, in order to enable the user to set the system in the "protected" mode or "unprotected", mode, as will be described herebelow.

Once the code segment has been transferred to the RAM of the host computer system it is executed thereby so as to, firstly, establish communication with the Supervisor, and then provide a user display screen (known as the HARD-WALL banner—HARDWALL is a registered trade mark of Vircon Limited) which permits the user to select a desired protection mode, namely either "protected" or "unprotected". If the user selects the "protected" mode the code segment then requests a list of dormant partitions from the Supervisor and displays them on the screen of the computer system and prompts the user to select one or more partitions from the list. Once the user has selected one or more partitions the code segment informs the Supervisor of this choice. Prior to selecting a partition or partitions, which then become active, the system will previously have been configured in terms of partitions and a level of protection associated with them. These may be established by means of a software utility. In general, there are three types of partition, namely general partitions, read-only partitions and WMR partitions. Typically, a read-only partition and a WMR partition are always available. At the start of a session, when a general partition (or partitions) is selected and made active it is granted full read/write access. The remaining general partitions then become dormant whereby the Supervisor prevents their contents being accessed and hence protects them during that particular user session (which lasts until switch-off or re-boot of the computer system). Read-only partitions are granted read access only, all write commands being prohibited by the Supervisor. The function and features of the Supervisor are disclosed and described in detail in U.S. Pat. No. 5,657,473 (incorporated herein by reference) and will therefore not be repeated here.

In the preferred embodiment, at the stage of the process where the user selects one or more active partitions, the executed code segment will make available to the user one or more partitions designated as Write-Many-Recoverable (WMR) partitions. If a write command is issued by the host system (e.g. by a user program) to overwrite any resident information stored in that WMR partition, the updated information is stored elsewhere on the disk platter(s) in a dedicated area thereof, and a pointer to the updated information is kept (in the RAM chip 5 of the drive) so the updated information can be accessed as required during the remainder of the session, and wherein a system reset causes the list of pointers to the updated information, and optionally also the updated information itself, to be cleared. Each WMR partition has a Sector Relocation Table (SRT) associated with it containing the pointers which define the address of a range of sectors in the WMR partition which have been updated and an address where the updated information is located. This updated information is located in a dedicated area of the disk platter(s) which is accessible only to, and is protected by, the Supervisor. This may be achieved by the dedicated area being disposed in an area of the disk platter(s) to which any access by the host system is denied by the Supervisor, the dedicated area in this manner being effectively "hidden" from the host system. Alternatively, the dedicated area could be disposed outside the physical area (namely tracks) of the disk platter(s) which is accessible to the host operating system, in an area which is accessible only to the Supervisor. The SRT table(s) are stored in the RAM chip 5 of the disk drive 1. The details and implementation of the WMR technique are disclosed and described in detail in EP 0 800 135 A1, previously referred to and incorporated herein by reference, and are therefore not described in any further detail herein. It will be appreciated that the WMR facility enables a user to write to the designated WMR partition(s) during a session on the computer system, but each time the computer system is re-booted all changes are erased so as to leave each WMR partition in its original state. Typically, the boot partition will be chosen by the user to be designated a WMR partition.

In an alternative WMR technique, also described in EP 0 800 135 A1, if a partition is designated as WMR, in use, if a write command is issued to overwrite (i.e. update) any information stored in a/the WMR partition prior to undertaking said write command said information is copied and stored elsewhere on the storage medium to be copied back to said WMR partition when required. This could be implemented, for example, by a system reset. For the avoidance of doubt, the use of this alternative WMR is method is also intended to be within the scope of the present invention.

The RAM chip 5 is also used to store information regarding the protection state attributed to each partition in the drive at any given time, for example which partitions are active and which are inactive, which are WMR partitions, which are read/write accessible, which are read-only, etc. This information, which can be referred to as a Permission Table, is also stored in the RAM chip 5 of the disk drive 1.

Once the active partition(s) have been selected, and any WMR partitions, the code segment transfers the original disk boot sector stored in the disk drive to the host computer system RAM for execution thereby, the executed disk boot sector initiating operating system boot in the host system.

If, at the stage where the user is prompted to select "protected" or "unprotected" mode (i.e. "supervised" or "unsupervised"), the user selects "unprotected", the code segment prompts the user to enter a password. The password entered by the user is then transferred to the Supervisor firmware for validation thereby (by matching it against a correct password stored in the ROM chip 4 of the drive 1). A limited number of retries is permitted if the user enters an incorrect password. Once a correct password has been entered and validated, the code segment provides the user with the option of requesting to change the password. If such a request is made, the code segment prompts for a new password to be entered twice, the two entered passwords then being transferred to the Supervisor firmware for comparison and storage (in the ROM chip 4 of the drive). The Supervisor then enters the "unprotected" or "unsupervised" mode and the code segment proceeds to transfer the original disk boot sector to the host system RAM for execution thereby in order to initiate operating system boot in the host system.

A more detailed description of the above-described embodiment is not given herein, as this would be within the normal understanding of a person skilled in the art.

The embodiment of the present invention includes no physical electronic components that are not present in many commercially available hard disk drives. The invention requires only the following features in the disk drive in order to implement the invention thereon:

memory locations within the Read Only Memory (ROM) chip 4 to contain the firmware code to implement Supervisor functionality (the Supervisor firmware);

integration of the Supervisor firmware into the existing control firmware of the hard disk drive, ensuring that no interface request is serviced before the Supervisor firmware has checked and validated the request;

memory locations with the embedded Random Access Memory (RAM) 5 of the hard disk drive to store the SRT and Permission Table which are created and maintained during each session on the computer system;

memory locations within the ROM for the storage of the password for use in selecting supervised or unsupervised mode;

memory locations within the ROM 4 for the storage of the loader sector;

sectors on the hard disk drive itself for storage of the code segment which is required to be passed to the computer system and executed during the initial power up and configuration process, said sectors being within one or more reserved tracks on the disk surface which are inaccessible to the host computer system (and any user programs running therein) and accessible only to the Supervisor.

It should be noted that the Supervisor firmware is configured to prohibit any access to itself, or alteration to itself, by user commands (issued by a user or user program) which attempt to read, corrupt or modify the Supervisor firmware.

It will be appreciated that, as an alternative to providing the invention in the drive at manufacture thereof, where a hard drive having the necessary features outlined immediately above is provided, the invention could be implemented by loading the Supervisor firmware into the disk drive by means of a software utility program in order to obtain a disk drive which operates in accordance with the present invention. Although the Supervisor firmware will preferably be loaded into the ROM of the drive, it is envisaged that some or all of the Supervisor firmware could be written onto the disk platter(s). In this latter case, any of the Supervisor firmware which is stored on the disk platter(s) will be protected by the Supervisor itself so that a user or user program cannot gain read or write access thereto.

The embodiments of the present invention hereinbefore described are given by way of example only, and it will be appreciated that various modifications thereto will be possible without departing from the scope of the invention. In particular, the invention is applicable not only to storage devices in the form of hard disk drives, but also to other types of storage device. For example, the Supervisor firmware could be incorporated in a solid state storage device, such as a FLASH memory card. Also, the Supervisor firmware could be stored on an optical storage medium, such as a compact disc (CD) or digital video disk (DVD), for use in an optical storage device, e.g. CD or DVD drive. Equally, some or all of the Supervisor firmware could be stored in the ROM of a CD or DVD drive.

What is claimed is:

1. A storage device for a host computer system, the storage device comprising:
   storage means for storing information;
   intelligent means for controlling the transfer of information to and from the storage means; and
   interfacing means for interfacing the storage device with the host computer system and via which information is transferred to and from the storage means under the control of said intelligent means,
   the storage means comprising:
      a storage medium including a boot partition divided into a plurality of sectors, the boot partition including a boot sector where the host computer system seeks code to perform operating system boot of the host computer system;
      non-volatile read-only memory (ROM) means for storing firmware for controlling operation of the storage device; and
      volatile random-access-memory (RAM) means;
   wherein supervising means is incorporated in said storage means for operating said intelligent means so as to protect information stored in the storage medium, said supervising means being incorporated at least partly as firmware which is stored in said non-volatile ROM means, and wherein the storage device further includes:
   a host executable code segment, stored in said storage means, for allowing user control of the supervising means via the host computer system and for controlling initiation of operating system boot in the host computer system; and
   loader means stored in the storage means and comprising host executable code for loading said code segment to the host computer system and causing the host computer system to execute the loaded code segment; and
   wherein said supervising firmware stored in the ROM means is adapted to intercept any request for said boot sector, issued by the host computer system in use thereof, and to supply said loader means to the host computer system to satisfy the request.

2. A storage device according to claim 1, wherein the supervising means is provided wholly as firmware which is stored in said non-volatile ROM means on the storage device.

3. A storage device according to claim 1, wherein the intelligent means comprises a microcontroller which runs the supervising firmware stored in the ROM means.

4. A storage device according to claim 1, wherein the supervising means operates said intelligent means so as to allow/restrict/prohibit read/write operations upon the storage medium depending upon whether information to be read from a sector or written to a sector is operating system information or user information, whether the sector is in the boot partition or in a general partition, and whether if the partition is a general partition the partition is active or inactive.

5. A storage device according to claim 4, wherein the supervising means also ensures that firmware stored on the ROM means of the storage device, which includes the supervisor firmware, is also protected in that a user, or a user program operating in the host computer system, does not have access to the ROM means of the storage device itself.

6. A storage device according to claim 1, wherein the supervising means is configured so as to cause a warning to be issued to the user should an attempt be made to perform a prohibited read, write or format operation.

7. A storage device according to claim 1, wherein the supervising means is operable to designate at least one partition of the storage device as a Write Many Recoverable (WMR) partition, the supervising means operating such that, if a write command is issued to overwrite any information stored in the WMR partition, the updated information is stored elsewhere on the storage medium, and a pointer to the updated information is provided so the updated information can be accessed as required during the remainder of the session and wherein a system reset causes the pointer to the updated information to be cleared.

8. A storage device according to claim 7, wherein the or each WMR partition has a Sector Relocation Table (SRT) associated therewith which is held in said volatile RAM means of the storage device, and each entry in a said SRT is a pointer which defines the address of a range of sectors in the WMR partition that have been updated and an address where the updated information is located, this location being within a dedicated area on the storage medium which is accessed only by the supervisor means.

9. A storage device according to claim 1, wherein the supervising means is operable to designate at least one partition of the storage device as a Write Many Recoverable (WMR) partition, the supervising means operating such that, if a write command is issued to overwrite any information stored in said at least one WMR partition, prior to undertaking said write command said information is copied and stored elsewhere on the storage medium to be copied back to said WMR partition when required.

10. A storage device according to claim 1, wherein the loader means is configured to load said code segment to a central processing unit (CPU) of the host computer system for execution by the host computer system prior to operating system boot.

11. A storage device according to claim 10, wherein the loader means is provided in said non-volatile ROM means of the storage device.

12. A storage device according to claim 10, wherein said loader means is provided in a reserved area on the storage medium, which reserved area is inaccessible to a user or user program.

13. A storage device according to claim 10, wherein the code segment is provided in said non-volatile ROM means of the storage device.

14. A storage device according to claim 10, wherein the code segment is provided in a reserved area of the storage medium which is inaccessible to a user or user program, but is accessible to the supervising means, whereby unauthorized alteration of the code segment is prevented.

15. A storage device according to claim 1, wherein said host executable code segment comprises code for enabling the storage device to be set in either "supervised" mode, in which the supervising means is active, or "unsupervised" mode in which the supervising means is not active.

16. A storage device according to claim 15, wherein said code segment, when executed, provides user prompts which allow a user to select said "supervised" mode, or by entry of a password select said "unsupervised" mode, and the code segment is constructed such that, subsequent to mode selection by the user, the code segment transfers a boot program from the boot sector of the storage medium and causes the host computer system to execute said boot program so as to initiate operating system boot in the host computer system.

17. A storage device according to claim 10, wherein said storage device is a hard disk drive and the storage medium comprises at least one disk platter, and said loader means is provided in at least one reserved track of said at least one disk platter.

18. A storage device according to claim 1, wherein the storage device is a hard disk drive.

19. A storage device according to claim 18, wherein the storage medium comprises at least one disk platter.

20. A storage device according to claim 1, wherein the storage device is a solid state storage device.

21. A storage device according to claim 1, wherein the storage device is an optical storage device.

22. A method of controlling access to and modification of information stored on a storage medium of a storage device for incorporation in a host computer system wherein the storage device comprises storage means for storing information, intelligent means for controlling the transfer of information to and from the storage means, and interfacing means for interfacing the storage device with the host computer system and via which information may be transferred to and from the storage means under the control of said intelligent means, and the storage means within the storage device comprises: said storage medium including at least a boot partition divided into a plurality of sectors, the boot partition including a boot sector where the host computer system will seek code to perform operating system boot of the host computer system; non-volatile read-only-memory (ROM) means (4) for storing firmware for controlling operation of the storage device; and volatile random-access-memory (RAM) means; the method comprising the steps of:
providing supervising means in said storage means for operating said intelligent means so as to protect information stored in the storage medium, said supervising means being incorporated at least partly as firmware which is stored in said nonvolatile ROM means;
storing in said storage means a host executable code segment for allowing user control of the supervising means via the host computer system and for controlling initiation of operating system boot in the host computer system;
storing in the storage means loader means comprising host executable code for loading said code segment to the host computer system and causing the host computer system to execute the loaded code segment, said supervising firmware stored in the ROM means being adapted to intercept any request for said boot sector, issued by the host computer system, and to supply said loader means in response to the request; and
incorporating the storage device in a host computer system, and running the host computer system with the supervising means operating said intelligent means so as to protect information stored in the storage medium.

23. A method according to claim 22, wherein said supervising means is provided for allowing/restricting/prohibiting read/write operations upon the storage medium depending upon whether information to be read from a sector or written to a sector is operating system information or user information, whether the sector is in the boot partition or in a general partition, and whether if the partition is a general partition the partition is active or inactive, said supervising means intercepting each interface request from the host computer system to said storage device;
wherein the loader means loads said code segment to a_RAM_of a central processing unit (CPU) of the host computer system for execution by the host computer system prior to operating system boot, and the code segment, when executed, initiates a user interface procedure whereby a user may select a protection option from a selection of protection options; and
wherein, subsequent to a said selection having been made by the user, said code segment transfers a boot program from the boot sector of the storage medium and causes the host computer system to execute said boot program so as to initiate operating system boot in the host computer system.

24. A method according to claim 23, wherein said selection of protection options includes the option, by entering a predetermined password, of setting the storage device in "unsupervised mode" whereby interface requests are not intercepted by the supervising means.

25. A method according to claim 24, wherein the selection also includes the option of setting the storage device in "supervised" mode and designating at least one partition as a Write Mary Recoverable_(WMR) partition, the supervising means operating such that, if a write command is issued to overwrite any resident information stored in said at least one WMR partition by updated information, the updated information is written on the storage medium in a location other than where any resident information is stored and a pointer to the updated information is provided so that the updated information can be accessed as required during the remainder of a session.

26. A method according to claim 25, further including storing a Sector Relocation Table (SRT) which contains the pointers associated with each said WMR partition in the volatile RAM means of the storage device.

27. A method according to claim 24, further including the option of setting the storage device in "supervised" mode and designating at least one of said partitions a Write Many Recoverable (WMR) partition wherein, in use, if a Write command is issued to overwrite any information stored said at least one MMR partition, prior to undertaking said write command said information is copied and stored elsewhere on the storage medium to be copied back to said WMR partition when required.

28. A computer system, comprising:
(a) a processor; and
(b) a storage device communicably coupled to the processor, the storage device comprising:
(i) storage means for storing information, comprising:
(A) a storage medium including a boot partition divided into a plurality of sectors, the boot partition including a boot sector capable of permitting the processor to seek code at the boot sector to perform operating system boot of the computer system; and
(B) non-volatile read-only memory (ROM) means for storing firmware for controlling operation of the storage device
(ii) intelligent means for controlling the transfer of information to and from the storage means; and
(iii) interfacing means for interfacing the storage device with the processor and via which information is transferred to and from the storage means under the control of the intelligent means,
wherein the storage means further comprises:
(C) supervising means for operating the intelligent means to protect information stored in the storage medium, the supervising means being incorporated at least partly as firmware which is stored in the non-volatile ROM means, wherein the storage device further comprises:
(iv) an executable code segment, stored in the storage means, for allowing user control of the supervising means via the processor and for controlling initiation of operating system boot in the computer system; and
(v) loader means stored in the storage means and comprising executable code for loading the code segment to the processor and causing the processor to execute the loaded code segment; and wherein the supervising firmware stored in the ROM means is adapted to intercept any request for the boot sector, issued by the processor in use thereof, and to supply the loader means to the processor to satisfy the request.

* * * * *